Figure 1:
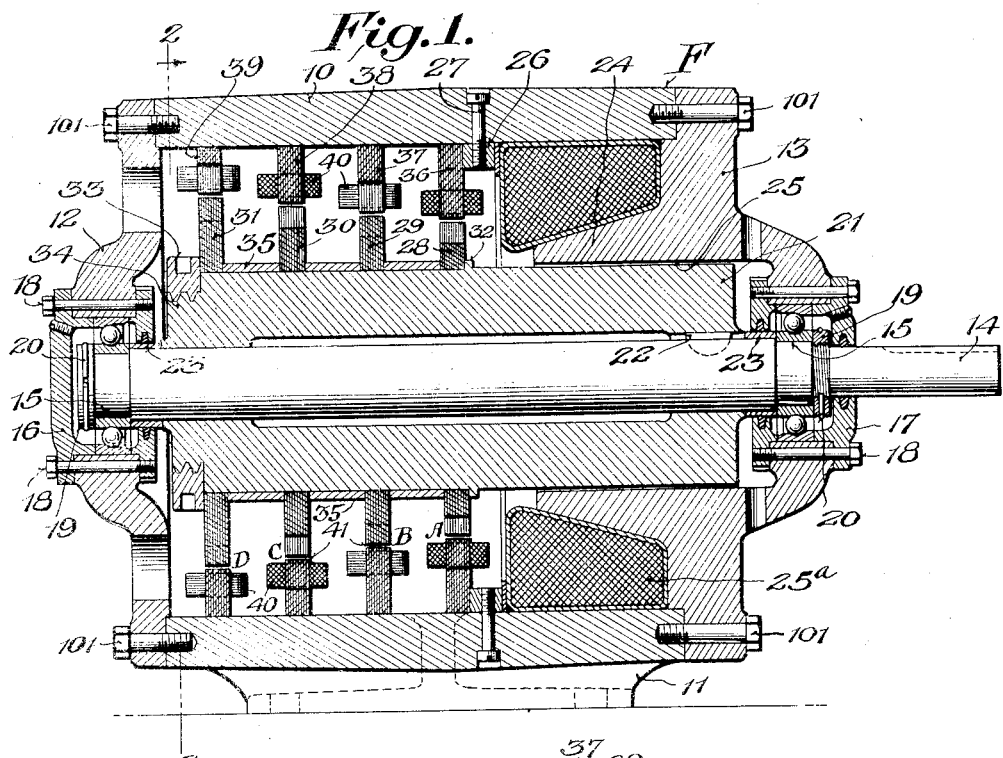

Dec. 11, 1923.

F. LOWENSTEIN 1,477,271

MULTIFREQUENCY GENERATOR

Original Filed Dec. 9, 1918

Witness
Chas. L. Griesbauer

Inventor
F. Lowenstein,
By M. C. Massie
His Attorney

Patented Dec. 11, 1923.

1,477,271

UNITED STATES PATENT OFFICE.

FRITZ LOWENSTEIN, OF BROOKLYN, NEW YORK; JOHN C. WAIT ADMINISTRATOR OF SAID FRITZ LOWENSTEIN, DECEASED, ASSIGNOR TO WILLIAM DUBILIER, OF NEW YORK, N. Y.

MULTIFREQUENCY GENERATOR.

Application filed December 9, 1918, Serial No. 265,930. Renewed September 13, 1923.

*To all whom it may concern:*

Be it known that I, FRITZ LOWENSTEIN, a citizen of the United States, residing at Brooklyn, in the county of Kings and State of New York, have invented certain new and useful Improvements in Multifrequency Generators; and I do hereby declare the following to be a full, clear, and exact description of the invention, such as will enable others skilled in the art to which it appertains to make and use the same.

This invention relates to dynamo electric machines and particularly to a multi-frequency generator especially suitable for use in connection with wireless telegraph apparatus.

One object of my invention is to produce a simple and compact generator from which currents at any one of several different frequencies may be obtained selectively at any given speed.

The field winding that produces the magnetizing flux in generators may, at times, be damaged by burn-out or otherwise; and it is therefore another object of this invention to provide a generator construction in which the field winding is supported in or on the enclosing generator frame or housing in such manner that it shall be readily removable and replaceable independently of the other main elements of the machine and without disturbing such elements, whereby repair or replacement of the winding is greatly facilitated.

Still another object of the invention is to provide a construction in which the rotors and their supporting means are of such form and arrangement as to be easily insertable into and removable from the generator housing without disturbing the other parts of the generator.

In an especially desirable construction in which the objects of my invention are attained, I provide a structure embodying a plurality of spaced stators, respectively coaxial with rotors carried by a shaft mounted within the frame or housing of the dynamo electric machine, the removable end wall of which has a boss that projects axially into the frame and partly houses the field winding which is mounted in coaxial relation to the sets of rotors and stators, and most advantageously adjacent said end wall. This manner of mounting the field winding permits the removal of the winding axially from the housing without disturbing the sets of rotors and stators. The sets of rotors and their support, considered as a whole, form what may be described as a generally conical structure fitting within the complementarily disposed sets of stator. The rotor structure is therefore axially movable into and out of the housing with a maximum of ease and convenience. The construction thus generally described and more fully hereinafter explained is a particularly advantageous one; but to attain the same objects, other constructions may be provided that, nevertheless, embody the principles of my invention. It is to be understood that the principles of the invention can be embodied in both motors and generators.

The objects and novel features of my invention will be apparent from the following description taken in connection with the drawing, illustrating a typical construction within the invention.

Figure 2:
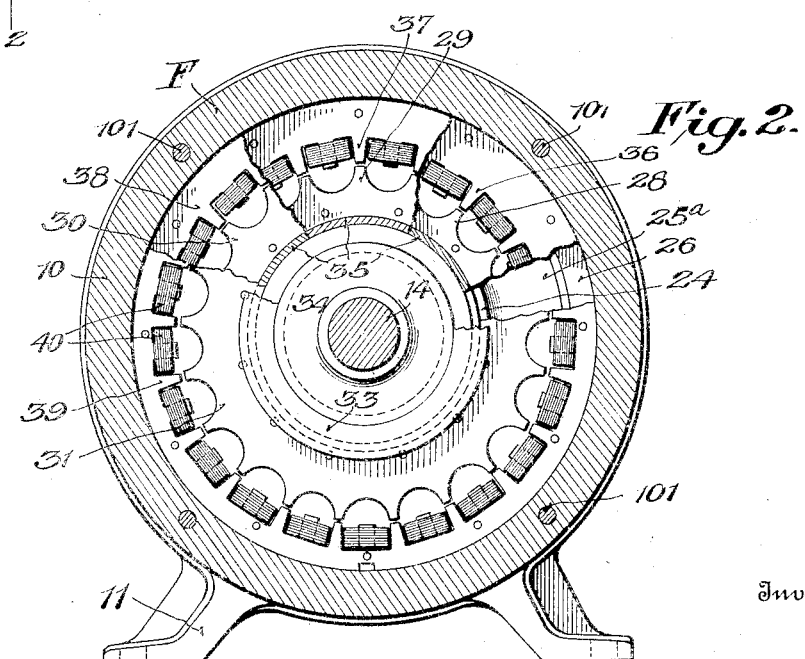

Fig. 1 is a longitudinal central sectional view of a multi-frequency generator embodying my invention, and Fig. 2 is a transverse sectional view of the same, taken on the line 2—2 of Fig 1, showing parts broken out to more clearly disclose the construction of the stators, rotors, and magnetizing field winding.

Referring to the drawings, the generator frame or housing F comprises a hollow substantially cylindrical body 10, provided with feet 11, and end shields or walls 12 and 13, secured to the ends of the body 10 by bolts 101. These walls close the ends of the body and are readily removable therefrom. The generator is provided with a driving shaft 14 mounted in ball bearings 15, 15, carried in central openings in the end shields 12 and 13. The bearings 15, 15 are held in position by suitable bearing retainers 16 and 17, secured to the end shields by the bolts 18, the bearing retainer 17 secured to the end shield 13 having a central opening therein through which one end of the shaft 14 projects, and is arranged to be coupled to a device, such as an electric motor, for driving the generator. The inner races of the ball bearings 15, 15 are retained in position, abutting shoulders provided on shaft 14, by nuts 19, locked to the shaft 14 by springs 20.

The shaft 14 carries a rotor-supporting sleeve or hollow cylinder 21 keyed thereto at 22 and limited against endwise movement thereon by the rings 23 disposed within the bearing retainers 17 and abutting against the inner edges of the inside races of the ball bearings 15. The end shield 13 has an integral inwardly projecting boss 24 provided with a bore 25 that is of sufficient diameter to receive the sleeve 21 the air gap between the sleeve and shield being as small as possible. The outer surface of the boss 24 tapers inwardly to partly encase the annular field winding 25$^a$ which produces the magnetizing flux for all the rotor-stator sets. The winding 25$^a$ is held in place against endwise movement in said housing by the end plate or shield 13 and the retaining ring 26 that is secured to the body 10 by bolts 27.

The rotor-supporting sleeve 21 is adapted to support a number of rotor structures, depending on the number of frequencies desired. In the present instance, the generator is designed to generate at any one of four different frequencies and accordingly I have shown four rotor structures, 28, 29, 30, and 31, supported thereon, the rotor structures being built up of laminations and constituting the rotating elements of the rotor-stator sets A, B, C and D. The end rotor 28 abuts against the shoulder 32 on the sleeve 21 and the other end rotor 31 is held in place by a nut 33 that is secured on the screw-threaded reduced end 34 of the rotor sleeve. The intermediate rotors 29 and 30 are spaced from the end rotors 28 and 31 and from each other by spacing rings 35.

The number of poles on the rotors 28, 29, 30 and 31, differ from each other so that when the shaft 14 is rotated at any given speed, currents of a plurality of different frequencies will be generated. In the present instance, the number of poles on the rotors 28, 29, 30 and 31, are 18, 19, 20 and 21, respectively, the range being small so that the frequencies produced at one speed, say 2700 r. p. m., are 810, 855, 900 and 945 cycles per second, for example, and, therefore, do not differ very greatly from one another, but afford a number of currents of differing frequencies, selectable as desired. The several different frequencies are simultaneously produced and, therefore, current at different frequencies may, if desired, be supplied simultaneously from the generator. It is to be understood that it is not necessary that the stated speed of rotation and pole number be adhered to, inasmuch as these may be altered to suit various conditions and permit the generation of currents of different frequencies, as desired. The rotors are progressively of greater external diameter from the rotor 28 to the rotor 31 that is farthest removed from the winding 25. By this arrangement the teeth or poles on the rotors may be kept of the same circumferential length, so that the same size dies may be used in cutting the teeth or poles of the various laminations from which the rotors are built. In the present instance, four stators, 36, 37, 38, and 39, are secured to the inner side of the frame 10, the stators being positioned opposite the rotors 28, 29, 30 and 31, respectively, and each stator being provided with the usual windings 40. This coned or stepped arrangement of the cooperating rotor and stator sets renders it a very simple matter to slide the stators and their support out of the housing without in any way disturbing the other parts of the machine, the end place 12 being first removed, of course, to permit this operation.

Suitable terminals (not shown) are provided, to which the windings 40 of the stators are connected, and from which current may be supplied at the different frequencies to a load circuit or circuits. Current for the exciting field winding may be supplied by some suitable source, such as a direct current generator. All of the metallic parts of the magnetic circuit, that is, the sleeve 21, the laminations of the rotor-stator sets A, B, C and D, the frame 10 and the end shield 13, should be of high permeability in order to provide a path of low reluctance for the magnetic flux.

The operation of the generator will be understood from the foregoing description. The shaft 14 being driven at a suitable speed and the exciting coil 25$^a$ being energized, current may be generated at four different frequencies in the generator illustrated, and for any change of speed the frequencies of the four sets of rotor-stator elements will change accordingly. A damaged field winding may readily be removed by taking off the end shield 13, and sliding the winding out of that end of the housing, without disturbing the rotor-stator elements and other parts of the machine, and similarly, the rotor sets and their support can be readily moved out of the other end after removing shield 12, as already explained. These features are particularly desirable in machines used for wireless communication, where practically uninterrupted service is essential. The generator illustrated as an example, is of ½ kilowatt capacity, being designed for use with wireless telegraph transmitting devices and developing 10 amperes at 50 volts, when driven at 2700 revolutions per minute. However, the size and the application of the generator are not limited to those given.

While I have shown and described the dynamo electric machine in detail, it will be understood that various features thereof may be modified without departing from the spirit and principles of my invention.

I claim:

1. In a dynamo-electric machine, the combination with a plurality of stators arranged in sets of different internal diameters, of a corresponding number of rotors arranged in sets of different external diameters respectively cooperating with the sets of stators, said diameters decreasing regularly from one end of the machine toward the other, and means for producing a magnetizing flux in said stators and rotors.

2. In a dynamo-electric machine, the combination with a frame, of a plurality of sets of stators secured therein, said sets of stators being of different internal diameters and having poles of substantially the same size, said diameters decreasing regularly from one end of the machine toward the other, windings on said stators, a rotatable shaft mounted in said frame, a plurality of sets of rotors removably mounted as a structural unit on said shaft and respectively disposed concentrically to said sets of stators, said sets of rotors being also of different external diameters corresponding to the stator set diameters and having poles of substantially the same size, a separable housing plate at the end of the frame adjacent the stator set of greatest diameter, and means whereby a magnetizing flux is produced in said rotors and stators.

3. In a dynamo-electric machine, the combination with housing means provided with removable end walls, of a plurality of sets of cooperating rotors and stators removably disposed within said frame, said sets decreasing in diameter from a location adjacent one of said end walls, and a field winding removably disposed adjacent the other end wall.

In testimony whereof I hereunto affix my signature.

FRITZ LOWENSTEIN.

Witness:
P. A. NEWMAN.